(12) United States Patent
Langeloh et al.

(10) Patent No.: US 6,439,760 B1
(45) Date of Patent: Aug. 27, 2002

(54) MIXER APPLIANCE

(76) Inventors: Deborah L. Langeloh; Arthur Langeloh, both of 6761 N. Avenida de las Palazas, Tucson, AZ (US) 85750

(*) Notice: Subject to any disclaimer, the term of this patent is extended or adjusted under 35 U.S.C. 154(b) by 41 days.

(21) Appl. No.: 09/677,014

(22) Filed: Sep. 29, 2000

(51) Int. Cl.⁷ .................................................. B01F 7/20
(52) U.S. Cl. .................... 366/206; 366/297; 366/331; 99/348
(58) Field of Search ............................. 99/348; 366/129, 366/197, 199, 206, 297, 299, 325.4, 329.1, 331, 343, 344, 601; 416/170 R, 170 HM, 206, 221

(56) References Cited

U.S. PATENT DOCUMENTS

| | | | | |
|---|---|---|---|---|
| 50,958 A | * | 11/1865 | Riley | |
| 66,855 A | * | 7/1867 | Klenner | |
| 268,185 A | * | 11/1882 | Caufman | |
| 328,457 A | * | 10/1885 | Burry | |
| 414,566 A | * | 11/1889 | Nelleson | |
| 772,701 A | * | 10/1904 | Deal | |
| 1,248,327 A | * | 11/1917 | Hoerburger | |
| 1,905,302 A | * | 4/1933 | Parkin | |
| 2,116,764 A | * | 5/1938 | Meeker | |
| 2,449,578 A | * | 9/1948 | Barr | |
| 3,271,013 A | * | 9/1966 | Chambers et al. | |
| 3,342,459 A | * | 9/1967 | Myer et al. | |
| 3,752,057 A | | 8/1973 | Groen, Jr. | |
| 4,022,412 A | * | 5/1977 | Houlf | |
| 4,104,737 A | | 8/1978 | Brailsford | |
| 4,325,643 A | * | 4/1982 | Scott et al. | |
| 4,429,624 A | * | 2/1984 | Linn | |
| 4,568,193 A | * | 2/1986 | Contri et al. | |
| 4,822,172 A | * | 4/1989 | Stottmann | |
| 5,372,422 A | | 12/1994 | Dubroy | |
| 5,476,321 A | * | 12/1995 | McNaughton | |
| 5,533,805 A | | 7/1996 | Mandel | |
| D372,632 S | | 8/1996 | Riskin | |
| 5,653,536 A | | 8/1997 | Mandel | |
| 5,782,558 A | * | 7/1998 | Roberts | |
| 5,816,136 A | | 10/1998 | Stallings | |
| 6,010,306 A | * | 1/2000 | Bucher et al. | |
| 6,171,059 B1 | * | 1/2001 | Bucher et al. | |
| 6,264,358 B1 | * | 7/2001 | Eisaman et al. | |

FOREIGN PATENT DOCUMENTS

JP            9-173216      *  7/1997

* cited by examiner

Primary Examiner—Charles E. Cooley
Assistant Examiner—David Sorkin

(57) ABSTRACT

A mixer appliance for automatically and accurately stirring foods without someone having to watch over the mixing thereof. The mixer appliance includes a housing having a base portion, a main portion extending upwardly from the base portion, and an overhang portion extending outwardly from a top of the main portion; and also includes a utensil drive assembly being disposed in the housing; and further includes utensils being removably and rotatably attached to the utensil drive assembly; and also includes a utensil drive control assembly being attached to the housing and being connected to the utensil drive assembly; and further includes a support assembly for securing and supporting the housing upon a countertop.

14 Claims, 4 Drawing Sheets

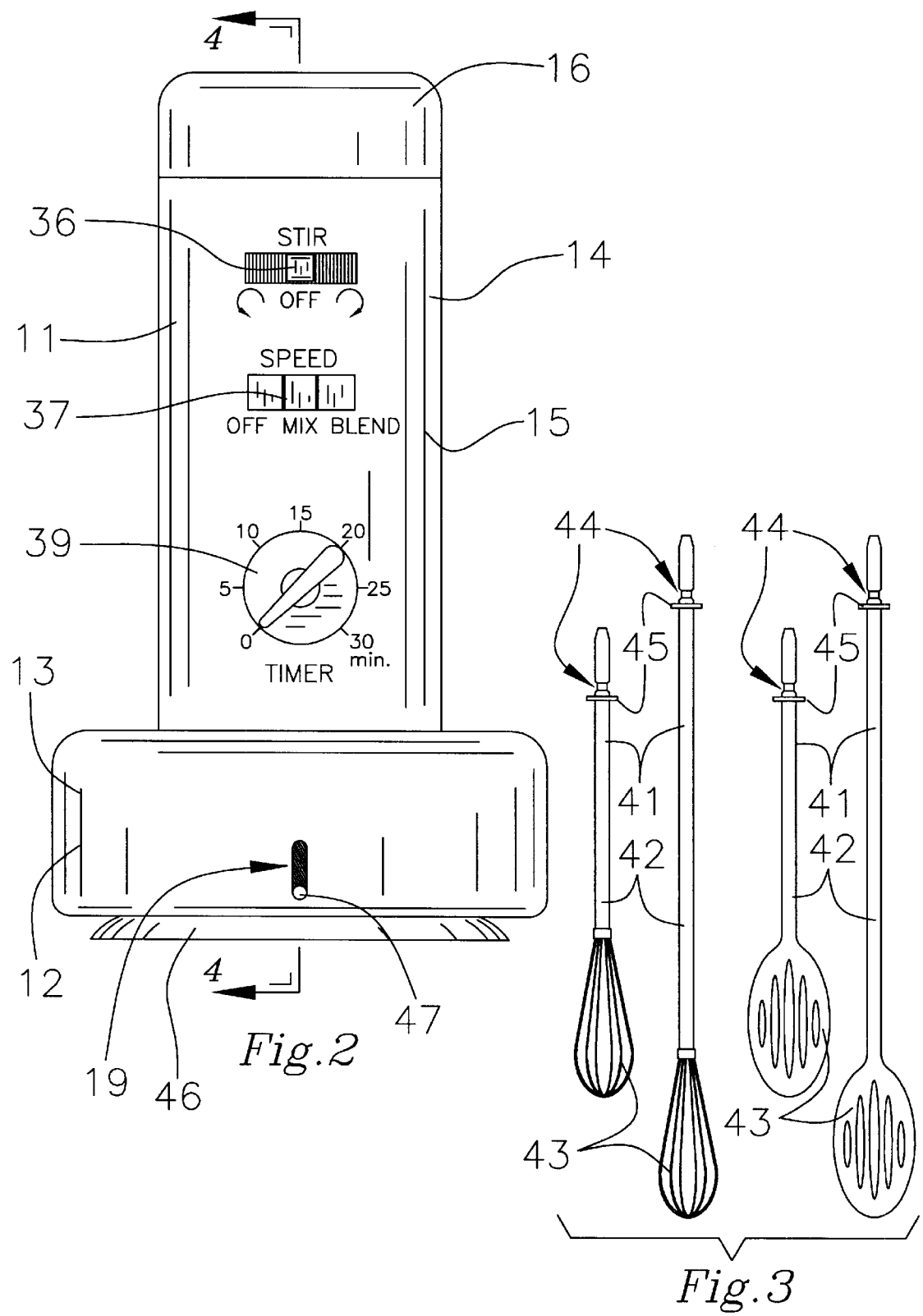

MIXER APPLIANCE

BACKGROUND OF THE INVENTION

1. Field of the Invention

The present invention relates to a counter attachable mixing device and more particularly pertains to a new mixer appliance for automatically and accurately stirring foods without someone having to watch over the mixing thereof.

2. Description of the Prior Art

The use of a counter attachable mixing device is known in the prior art. More specifically, a counter attachable mixing device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,372,422; U.S. Pat. No. 5,533,805; U.S. Pat. No. 5,653,536; U.S. Pat. No. 4,104,737; U.S. Pat. No. 5,816,136; and U.S. Pat. No. Des. 372,632.

While these devices fulfill their respective, particular objectives and requirements, the aforementioned patents do not disclose a new mixer appliance. The inventive device includes a housing having a base portion, a main portion extending upwardly from the base portion, and an overhang portion extending outwardly from a top of the main portion; and also includes a utensil drive assembly being disposed in the housing; and further includes utensils being removably and rotatably attached to the utensil drive assembly; and also includes a utensil drive control assembly being attached to the housing and being connected to the utensil drive assembly; and further includes a support assembly for securing and supporting the housing upon a countertop.

In these respects, the mixer appliance according to the present invention substantially departs from the conventional concepts and designs of the prior art, and in so doing provides an apparatus primarily developed for the purpose of automatically and accurately stirring foods without someone having to watch over the mixing thereof.

SUMMARY OF THE INVENTION

In view of the foregoing disadvantages inherent in the known types of counter attachable mixing device now present in the prior art, the present invention provides a new mixer appliance construction wherein the same can be utilized for automatically and accurately stirring foods without someone having to watch over the mixing thereof.

The general purpose of the present invention, which will be described subsequently in greater detail, is to provide a new mixer appliance which has many of the advantages of the counter attachable mixing device mentioned heretofore and many novel features that result in a new mixer appliance which is not anticipated, rendered obvious, suggested, or even implied by any of the prior art counter attachable mixing device, either alone or in any combination thereof.

To attain this, the present invention generally comprises a housing having a base portion, a main portion extending upwardly from the base portion, and an overhang portion extending outwardly from a top of the main portion; and also includes a utensil drive assembly being disposed in the housing; and further includes utensils being removably and rotatably attached to the utensil drive assembly; and also includes a utensil drive control assembly being attached to the housing and being connected to the utensil drive assembly; and further includes a support assembly for securing and supporting the housing upon a countertop.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mixer appliance which has many of the advantages of the counter attachable mixing device mentioned heretofore and many novel features that result in a new mixer appliance which is not anticipated, rendered obvious, suggested, or even implied by any of the prior art counter attachable mixing device, either alone or in any combination thereof.

It is another object of the present invention to provide a new mixer appliance which may be easily and efficiently manufactured and marketed.

It is a further object of the present invention to provide a new mixer appliance which is of a durable and reliable construction.

An even further object of the present invention is to provide a new mixer appliance which is susceptible of a low cost of manufacture with regard to both materials and labor, and which accordingly is then susceptible of low prices of sale to the consuming public, thereby making such mixer appliance economically available to the buying public.

Still yet another object of the present invention is to provide a new mixer appliance which provides in the apparatuses and methods of the prior art some of the advantages thereof, while simultaneously overcoming some of the disadvantages normally associated therewith.

Still another object of the present invention is to provide a new mixer appliance for automatically and accurately stirring foods without someone having to watch over the mixing thereof.

Yet another object of the present invention is to provide a new mixer appliance which includes a housing having a base portion, a main portion extending upwardly from the base portion, and an overhang portion extending outwardly from a top of the main portion; and also includes a utensil drive assembly being disposed in the housing; and further includes utensils being removably and rotatably attached to the utensil drive assembly; and also includes a utensil drive control assembly being attached to the housing and being connected to the utensil drive assembly; and further includes a support assembly for securing and supporting the housing upon a countertop.

Still yet another object of the present invention is to provide a new mixer appliance that enables the user to do other tasks while the food is being stirred Even still another object of the present invention is to provide a new mixer appliance that can be easily and conveniently set up to stir and mix food for a period of time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a rear elevational view of the present invention.

FIG. 3 is a side elevational view of the mixing utensils of the present invention.

DESCRIPTION OF THE PREFERRED EMBODIMENT

Figure 1:
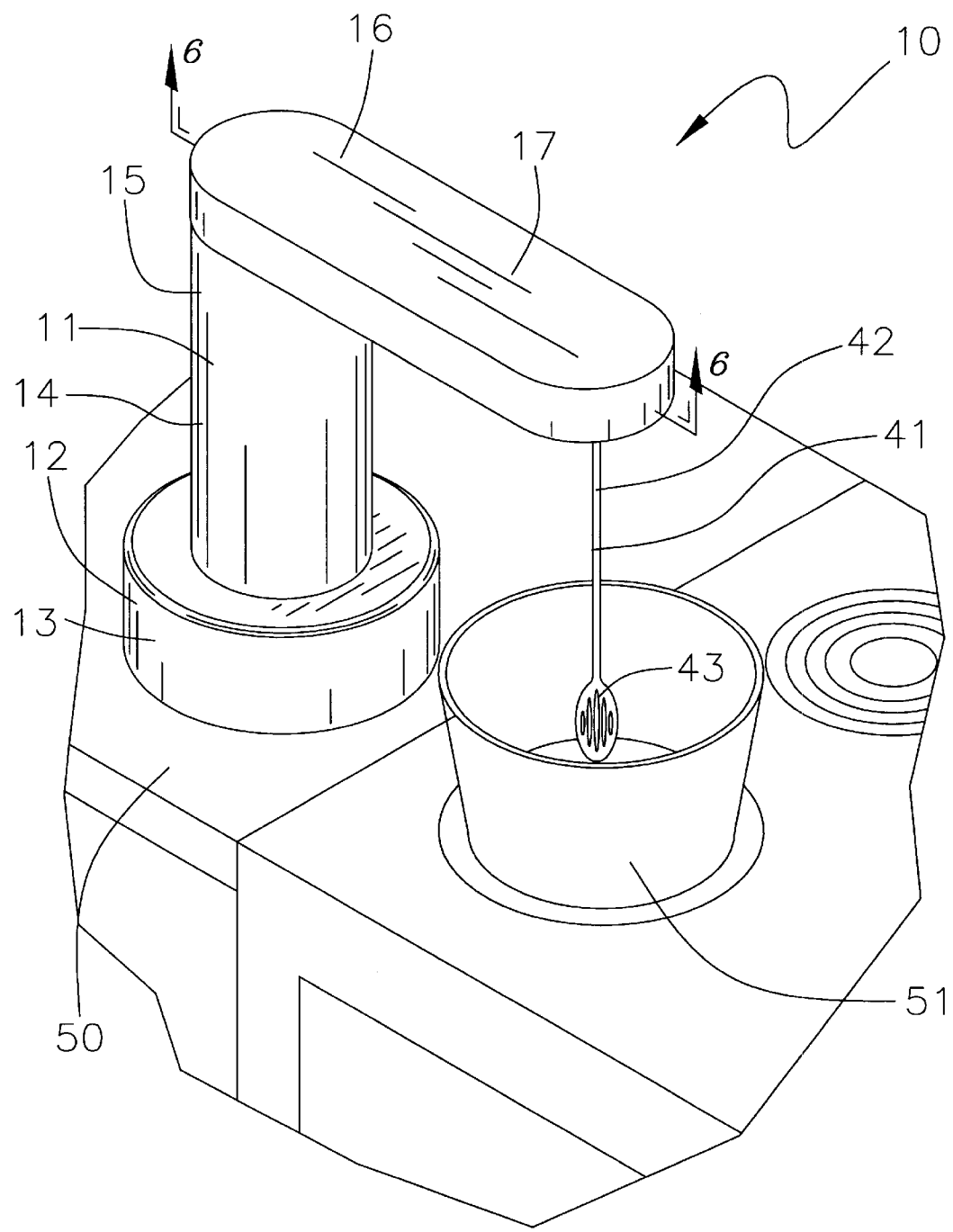
FIG. 1 is a perspective view of a new mixer appliance according to the present invention.
Figure 4:
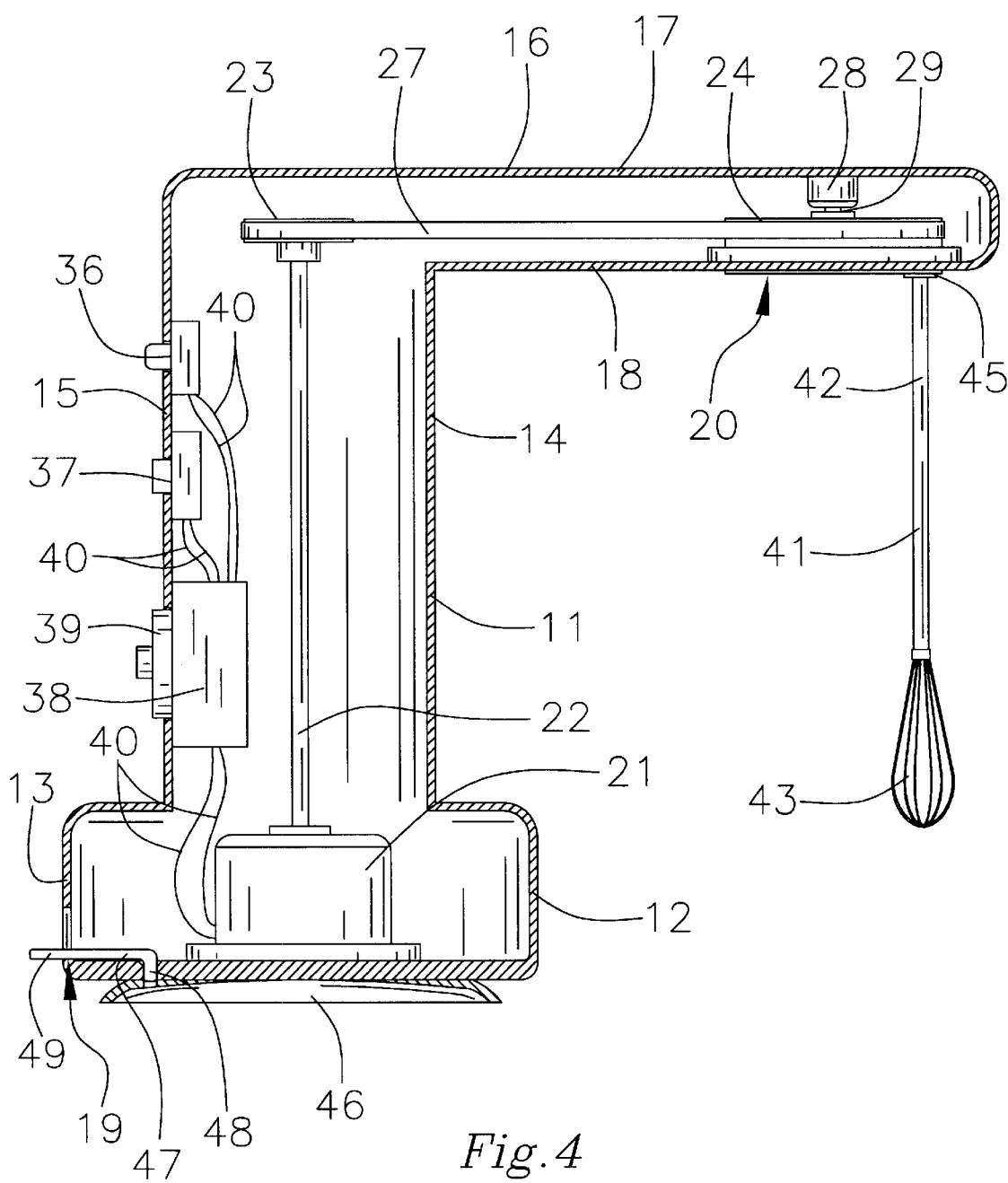
FIG. 4 is a side cross-sectional view of the present invention.
Figure 5:
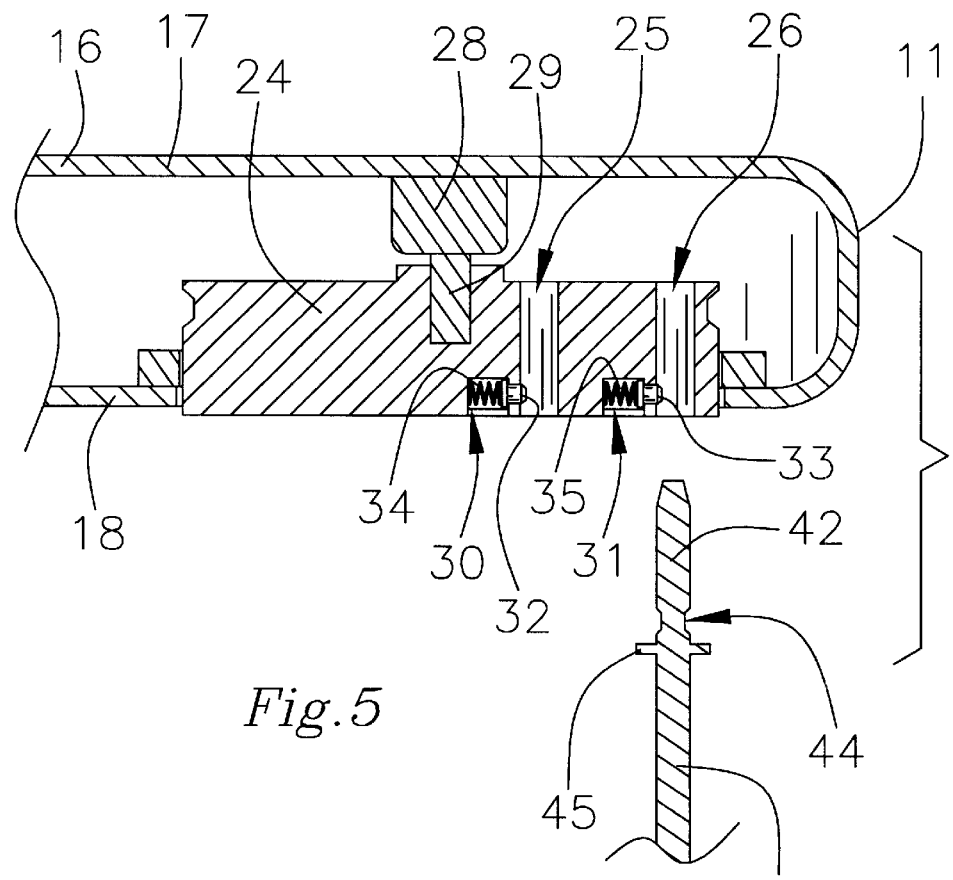
FIG. 5 is a detailed side cross-sectional view of the overhang portion of the present invention.
Figure 6:
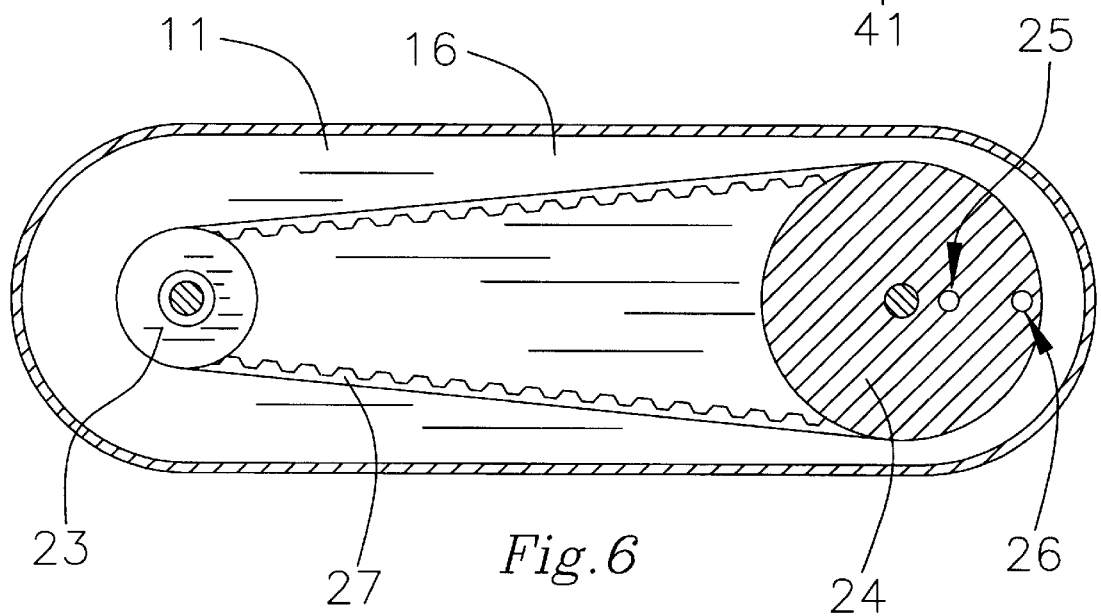
FIG. 6 is a top cross-sectional view of the overhang portion of the present invention.

With reference now to the drawings, and in particular to FIGS. 1 through 6 thereof, a new mixer appliance embodying the principles and concepts of the present invention and generally designated by the reference numeral 10 will be described.

As best illustrated in FIGS. 1 through 6, the mixer appliance 10 generally comprises a housing 11 having a base portion 12, a main portion 14 extending upwardly from the base portion 12, and an overhang portion 16 extending outwardly from a top of the main portion 14. The overhang portion 16 has an upper wall 17 and a lower wall 18 which has an opening 20 disposed therethrough. The main portion 14 has a side wall 15, and the base portion 12 has a side wall 13 which has a slot 19 disposed therethrough with the base portion 12 having a larger circumference than that of the main portion 14.

A utensil drive assembly is disposed in the housing 11, and includes a motor being securely and conventionally disposed in the housing 21, a drive shaft 22 being rotatably and conventionally attached to the motor 21, a first pulley 23 being conventionally mounted upon the drive shaft 22, a second pulley 24 being rotatably and conventionally mounted above the opening 20 in the overhang portion 16 and having bores 25,26 being radially spaced and disposed therein, and an endless belt 27 being carried about the first and second pulleys 23,24. Each of the bores 25,26 of the second pulley 24 has a slot 30,31 disposed in wall forming the bore 25,26. The utensil drive assembly further includes locking pins 32,33 movably disposed in the slots 30,31 in the second pulley 24 and being movably and biasedly extended in the bores 25,26 of the second pulley 24 and also includes spring members 34,35 being disposed in the slots 30,31 in the second pulley 24 and being mounted about the locking pins 32,33 for biasing the locking pins 32,33 into the bores 25,26. The utensil drive assembly further includes a bearing 28 having a shaft 29 and being securely and conventionally disposed in the overhang portion 16 of the housing 11 with the second pulley 24 being conventionally mounted to the shaft 29 of the bearing 28.

Utensils 41 are removably and rotatably attached to the utensil drive assembly. Each of the utensils 41 includes a shaft portion 42 which is adapted to be received in one the bores 25,26 of the second pulley 24, and also includes a stirring end portion 43 with the shaft portion 42 having an annular groove 44 extending thereabout near a top end thereof, and also having an annular ring 45 being securely attached about the shaft portion 42 below the annular groove 44. The stirring end portion 43 is either a whisk or a ladle having apertures being disposed therethrough. The locking pins 32,33 lockingly retain the shaft portions 42 of the utensils 41 in the bores 25,26 of the second pulley 24.

A utensil drive control assembly is attached to the housing 11 and is connected to the utensil drive assembly. The utensil drive control assembly includes an on/off switch 36 being movably and conventionally disposed in the side wall 15 of the main portion 14 of the housing 11, and also includes a two-speed switch 37 being movably and conventionally disposed in the side wall 15 of the main portion 14 of the housing 11, and further includes a timer switch 38 having a dial 39 and being conventionally disposed in the side wall 15 of the main portion 14 of the housing 11 and being connected to the on/off switch 36 and to the two-speed switch 37 and to the motor 21 with wires 40.

A support assembly for securing and supporting the housing 11 upon a countertop 50 includes a suction cup 46 being securely and conventionally mounted to a bottom side of the bottom wall of the housing 11, and also includes a release lever 47 being attached to the suction cup 46 and being movably disposed through the slot 19 in the side wall 13 of the base portion 12 of the housing 11. The release lever 47 includes a first portion 48 being securely attached to the suction cup 46 and also includes a second portion 49 which is angled relative to the first portion 48 and which extends through the slot 19 of the base portion 12 of the housing 11.

In use, the user secures the housing 11 to the countertop 50 using the suction cup 46, and inserts one or more utensils 41 in the bores 25,26 of the second pulley 24 and places a container 51 with the food products to be mixed under the utensil 41, and then turns on the on/off switch 36 and adjusts the speed of the utensil 41 by adjusting the two-speed switch 37 to mix and stir the food products contained in the container 51.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A mixer appliance comprising:
   a housing having a base portion, a main portion extending upwardly from said base portion, and an overhang portion extending outwardly from a top of said main portion, wherein said overhang portion has an upper wall and a lower wall which has an opening being disposed therethrough;
   a utensil drive assembly being disposed in said housing, wherein said utensil drive assembly includes a motor being securely disposed in said housing, a drive shaft being rotatably attached to said motor, a first pulley being mounted upon said drive shaft, a second pulley being rotatably mounted above said opening in said overhang portion and having bores radially spaced and disposed therein and an endless belt being carried about said first and second pulleys;
   utensils being removably and rotatably attached to said utensil drive assembly;
   a utensil drive control assembly being attached to said housing and being connected to said utensil drive assembly; and
   a support assembly for securing and supporting said housing upon a countertop.

2. A mixer appliance as described in claim 1, wherein each of said bores of said second pulley has a slot disposed in a wall forming said bore.

3. A mixer appliance as described in claim 2, wherein said utensil drive assembly further includes locking pins movably disposed in said slots in said second pulley and being movably and biasedly extended in said bores of said second pulley for removably and securely retaining said utensils in said bores, and also includes spring members being disposed in said slots in said second pulley and being mounted about said locking pins for biasing said locking pins into said bores.

4. A mixer appliance as described in claim 1, wherein said utensil drive assembly further includes a bearing having a shaft and being securely disposed in said overhang portion of said housing, said second pulley being mounted to said shaft of said bearing.

5. A mixer appliance as described in claim 1, wherein each of said utensils includes a shaft portion which is removably retained in one of said bores of said second pulley, and also includes a stirring end portion with said shaft portion having an annular groove extending thereabout near a top end thereof, and also having an annular ring being securely attached about said shaft portion below said annular groove, said utensils comprising a first utensil having a stirring end portion being a whisk, and a second utensil having a stirring end portion being a ladle having apertures being disposed therethrough.

6. A mixer appliance comprising:
   a housing having a base portion, a main portion extending upwardly from said base portion, and an overhang portion extending outwardly from a top of said main portion;
   a utensil drive assembly being disposed in said housing;
   utensils being removably and rotatably attached to said utensil drive assembly;
   a utensil drive control assembly being attached to said housing and being connected to said utensil drive assembly;
   a support assembly for securing and supporting said housing upon a countertop;
   wherein said overhang portion has an upper wall and a lower wall which has an opening being disposed therethrough; and
   wherein said main portion has a side wall, and said base portion has a side wall which has a slot disposed therethrough, said base portion having a larger circumference than that of said main portion;
   wherein said utensil drive assembly includes a motor being securely disposed in said housing, a drive shaft being rotatably attached to said motor, a first pulley being mounted upon said drive shaft, a second pulley being rotatably mounted above said opening in said overhang portion and having bores radially spaced and disposed therein, and an endless belt being carried about said first and second pulleys.

7. A mixer appliance as described in claim 6, wherein each of said bores of said second pulley has a slot disposed in a wall forming said bore.

8. A mixer appliance as described in claim 7, wherein said utensil drive assembly further includes locking pins movably disposed in said slots in said second pulley and being movably and biasedly extended in said bores of said second pulley for removably and securely retaining said utensils in said bores, and also includes spring members being disposed in said slots in said second pulley and being mounted about said locking pins for biasing said locking pins into said bores.

9. A mixer appliance as described in claim 6, wherein said utensil drive assembly further includes a bearing having a shaft and being securely disposed in said overhang portion of said housing, said second pulley being mounted to said shaft of said bearing.

10. A mixer appliance as described in claim 6, wherein said drive control assembly includes an on/off switch being movably disposed in said side wall of said main portion of said housing, and also includes a two-speed switch being movably disposed in said side wall of said main portion of said housing, and further includes a timer switch having a dial and being disposed in said side wall of said main portion of said housing and being electrically coupled to said on/off switch and to said two-speed switch and to said motor.

11. A mixer appliance as described in claim 6, wherein said support assembly includes a suction cup being securely mounted to a bottom side of a bottom wall of said housing, and also includes a release lever being attached to said suction cup and being movably disposed through said slot in said side wall of said base portion of said housing.

12. A mixer appliance as described in claim 11, wherein said release lever includes a first portion being securely attached to said suction cup and also includes a second portion which is angled relative to said first portion and which extends through said slot in said side wall of said base portion of said housing.

13. A mixer appliance as described in claim 6, wherein each of said utensils includes a shaft portion which is removably retained in one of said bores of said second pulley, and also includes a stirring end portion with said shaft portion having an annular groove extending thereabout near a top end thereof, and also having an annular ring being securely attached about said shaft portion below said annular groove, said utensils comprising a first utensil having a stirring end portion being a whisk, and a second utensil having a stirring end portion being a ladle having apertures being disposed therethrough.

14. A mixer appliance comprising:

a housing having a base portion, a main portion extending upwardly from said base portion, and an overhang portion extending outwardly from a top of said main portion, said overhang portion having an upper wall and a lower wall which has an opening being disposed therethrough, said main portion having a side wall, and said base portion having a side wall which has a slot disposed therethrough, said base portion having a larger circumference than that of said main portion;

a utensil drive assembly being disposed in said housing, said utensil drive assembly including a motor being securely disposed in said housing, a drive shaft being rotatably attached to said motor, a first pulley being mounted upon said drive shaft, a second pulley being rotatably mounted above said opening in said overhang portion and having bores radially spaced and disposed therein, and an endless belt being carried about said first and second pulleys, each of said bores of said second pulley having a slot disposed in a wall forming said bore, said utensil drive assembly further including locking pins movably disposed in said slots in said second pulley and being movably and biasedly extended in said bores of said second pulley and also including spring members being disposed in said slots in said second pulley and being mounted about said locking pins for biasing said locking pins into said bores, said utensil drive assembly further including a bearing having a shaft and being securely disposed in said overhang portion of said housing, said second pulley being mounted to said shaft of said bearing;

utensils being removably and rotatably attached to said utensil drive assembly each of said utensils including a shaft portion which is adapted to be received in one of said bores of said second pulley, and also including a stirring end portion with said shaft portion having an annular groove extending thereabout near a top end thereof, and also having an annular ring being securely attached about said shaft portion below said annular groove, said utensils comprising a first utensil having a stirring end portion being a whisk, and a second utensil having a stirring end portion being a ladle having apertures being disposed therethrough;

a utensil drive control assembly being attached to said housing and being connected to said utensil drive assembly, said utensil drive control assembly including an on/off switch being movably disposed in said side wall of said main portion of said housing, and also including a two-speed switch being movably disposed in said side wall of said main portion of said housing, and further including a timer switch having a dial and being disposed in said side wall of said main portion of said housing and being electrically coupled to said on/off switch and to said two-speed switch and to said motor; and a support assembly for securing and supporting said housing upon a countertop, said support assembly including a suction cup being securely mounted to a bottom side of a bottom wall of said housing, and also including a release lever being attached to said suction cup and being movably disposed through said slot in said side wall of said base portion of said housing, said release lever including a first portion being securely attached to said suction cup and also including a second portion which is angled relative to said first portion and which extends through said slot in said side wall of said base portion of said housing.

\* \* \* \* \*